Jan. 20, 1970  G. J. COBEN  3,490,287
RECTAL THERMOMETER
Filed Jan. 12, 1967

INVENTOR.
GERALD J. COBEN
BY
*Fay, Sharpe & Mulholland*
ATTORNEYS

United States Patent Office 3,490,287
Patented Jan. 20, 1970

3,490,287
RECTAL THERMOMETER
Gerald J. Coben, 4664 Walford,
Cleveland, Ohio 44128
Filed Jan. 12, 1967, Ser. No. 608,843
Int. Cl. G01k 1/04
U.S. Cl. 73—371     8 Claims

ABSTRACT OF THE DISCLOSURE

This application relates to a rectal thermometer in the form of a glass tube having an expanded blunt bulb at one end thereof. Mercury is in the bulb and the tube and a clear plastic coating entirely encloses the glass tube. The plastic coating further has a flanged portion along the axis of the thermometer at a distance from the bulb equal to the desired depth of insertion.

BACKGROUND OF THE INVENTION

There are many considerations that must be taken into account when constructing a rectal thermometer. Primary among these considerations is the elimination of safety hazards involved in the use of the rectal thermometer. A rectal thermometer should have a construction so that the bowel may not readily be pierced when the thermometer is inserted. In other words, it should have some means for holding it at the correct insertion depth to prevent the thermometer being pulled into the rectum by peristalsis or slipping out because it is insecurely held. The correct insertion depth is important if an accurate body temperature reading is to be obtained.

The thermometer should also have a protective means which would protect the patient from any mercury or glass entering his body if the thermometer should be broken.

The present rectal thermometers are usually made of glass having a rounded bulb on one end thereof. It is clear from their configuration that they may be easily overinserted, or if broken would expel mercury into the body of the patient.

A further problem in the use of the normal glass thermometers is that after a period of use, the numbers of the thermometers and the line divisions become illegible, thus making the thermometer essentially useless.

The applicant has provided a thermometer which is both efficient in its use and safe for the patient taking into account all of the above considerations. The applicant has designed such a rectal thermometer which can be readily inserted to its maximum effective length and yet is prohibited from being overinserted or drawn into the rectum by peristalsis. This is accomplished by a flange extending radially from the axis of the thermometer. The flange is usually comprised of a plastic material but may also be metal. The plastic is also used to coat the entire thermometer. In this manner, the chances of the patients bowel being pierced are reduced not only by the inability to overinsert the thermometer, but also by the presence of the plastic coating which would be softer than either metal or glass. Moreover, the plastic coating, because of its natural resiliency would not break if the thermometer should and would contain any broken glass and/or mercury. In this manner these dangerous objects are prohibited from entering the patient's body. The plastic coating, being integral with the flange and formed of the same material, will also stop the flange from slipping while on the thermometer.

The plastic coating prevents the wearing down of the numbers and the line divisions and thus permits a longer use life of the rectal thermometer.

In selecting the plastic coating, there are several types that may be used, however, in all cases the plastic coating should be readily adhesive to glass and have a clear color so that the indicia on the thermometer may be easily read. Moreover, the sensitivity of the thermometer should remain approximately the same as without the coating and therefore, the coefficient of thermal conductivity should be as high as possible. The coefficient of thermal conductivity may also be greater since this would simply enhance the heat transfer to the mercury in the metal bulb.

SUMMARY OF THE INVENTION

The present invention comprises a rectal thermometer having a glass tube with an expanded bulb, usually metal, at one end thereof. Mercury is in the bulb and the tube. A clear plastic coating surrounds the glass tube and forms a flanged portion extending radially from the axis of the thermometer.

Figure 5:
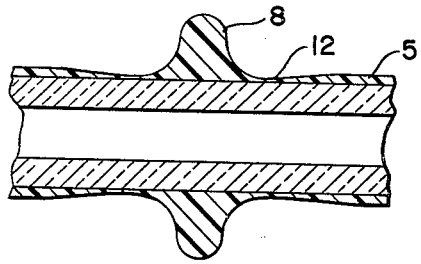

FIG. 5 indicates an alternate illustration of the flanged portion of this invention.

Figure 6:
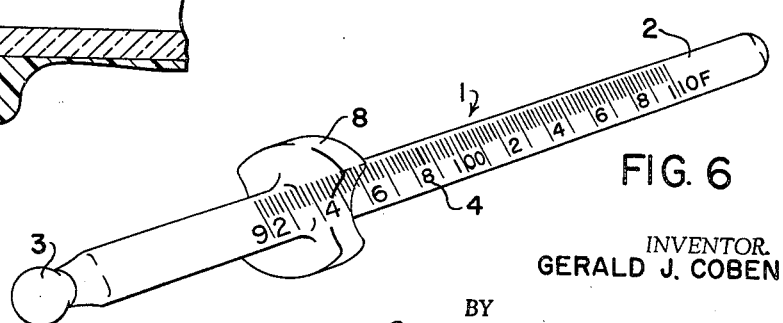

FIG. 6 indicates a perspective view of the thermometer of this invention.

The rectal thermometer 1 of this invention has a glass tube 2 with a rounded bulb 3. Indicia 4 which includes numbers and lines are positioned along the length of the thermometer 1. A plastic coating 5 covers the entire thermometer 2 and blub 3. Moreover, the plastic 5 forms a flange 8 along the length of the thermometer. The flange 8 extends radially outward from the axis of the thermometer and is positioned away from the bulb 3 a distance corresponding to the ideal distance that the thermometer should be inserted into the rectum. In the case of adults, this distance is approximately one and one half or two inches. In the case of children, it would be less.

Figure 1:
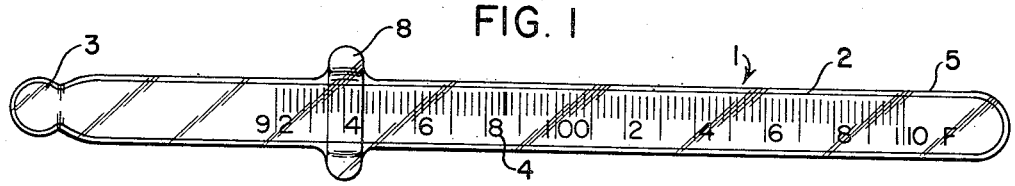
FIG. 1 shows a side view of the present invention.
Figure 2:
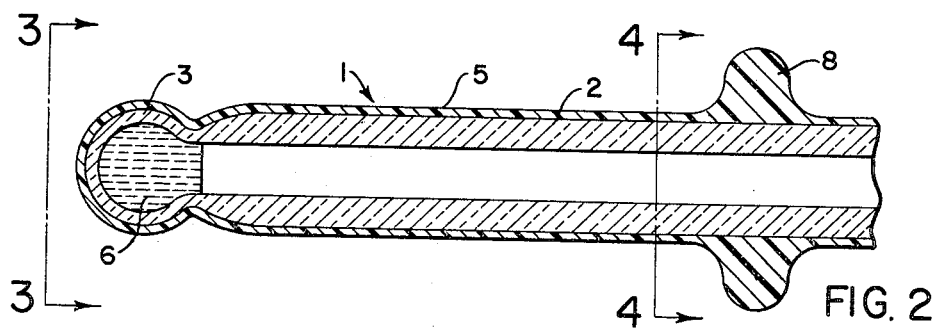
FIG. 2 illustrates a partially cut away section of the rectal thermometer and its plastic coating.
Figure 3:
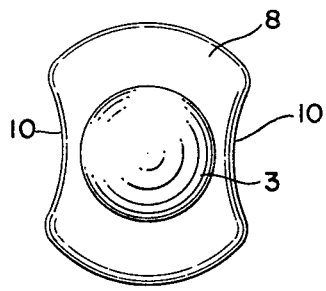
FIG. 3 shows a view taken along 3—3 of FIG. 2.
Figure 4:
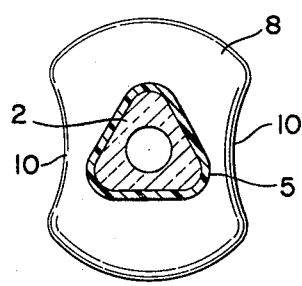
FIG. 4 shows a sectional 4—4 of FIG. 2.

The flange 8 may take various shapes such as circular or elliptical. A preferred shape, which is illustrated in FIGS. 3 and 4, is an hourglass configuration. The hourglass shape was chosen since this configuration has been found to be most useful. It permits the thermometer to be more securely held by the buttocks of the patient. The convex portions 10 conform to the buttocks of the patient so that it may be securely held in place and neither expelled nor taken into the patient through peristalsis.

The mercury 6 is normally in the bulb 3 and expands to indicate the body temperature of the patient on which the thermometer is being used. While a triangular shaped thermometer is illustrated (FIG. 4) it is anticipated that any cross-sectional configuration of a thermometer may be used.

FIG. 5 illustrates an alternate configuration from FIG. 4 in that the plastic covering 5 is tapered near the flange 8 at 12. This tapered effect is also used to more securely hold the thermometer in place. This depression of the plastic coating 5 at 12 complements the action of the concave portions 10 of the flange 8 in holding the thermometer in place. The low section 12 is a natural gripping means for the buttocks of the patient.

The clear plastic coating may be any one of several materials, however, Geon, a polyvinylchloride, manufactured by the B. F. Goodrich Rubber Company has been found to be satisfactory for the purposes involved in this case. Moreover, it has been found that a thickness of the coating of .001 inch to .02 inch does not significantly increase the time for the thermometer to reach an accurate reading. It is anticipated, however, that other plastics may be used as well as other thicknesses provided that they do not give discomfort to the patient, will adhere to glass, are insoluble in water, alcohol, zephiran and other organic substances, do not in any way hinder the accuracy of the thermometer or significantly increase the time involved for obtaining an accurate temperature reading. It should also be pointed out that other elastomeric materials such as rubber may be used to coat the thermometer and that the flange may be formed from glass or metal.

I claim:
1. A rectal thermometer comprising:
    an elongated sealed glass tube;
    an expanded bulb at one end of said glass tube;
    a liquid in said bulb and said tube which expands with heat;
    a resilient protective coating surrounding said glass tube to protect the patient if the thermometer should break; and
    a means for gauging the insertion of and prohibiting the over-insertion of the thermometer into the rectum comprising a flanged portion of such a size which cannot normally enter the rectum, said flanged portion extending radially outward from the axis of said glass tube at a distance from the bulb and thereof to insure the correct insertion depth and to hold the thermometer in place.
2. The rectal thermometer of claim 1 wherein said protective coating is a plastic material and said flanged portion is made of the same plastic material as said protective coating and is integral with it.
3. The rectal thermometer of claim 2 wherein said flange has a generally hourglass configuration with concave sides.
4. The rectal thermometer of claim 3 wherein said clear plastic coating is thinner on either side of said flange than on the remainder of said glass tube.
5. The rectal thermometer of claim 3 wherein said clear plastic material is polyvinylchloride.
6. The rectal thermometer of claim 1 wherein the distance between the flanged portion and the expanded bulb is no greater than approximately two inches.
7. The rectal thermometer of claim 6 wherein the glass tube is entirely surrounded by the plastic coating and the flange.
8. The rectal thermometer of claim 1 wherein the protective coating and the flanged portion are rubber.

References Cited

UNITED STATES PATENTS

| | | | |
|---|---|---|---|
| 2,445,539 | 7/1948 | Singer | 73—371 |
| 2,768,736 | 10/1956 | Govoni | 206—16.5 |

FOREIGN PATENTS

| | | |
|---|---|---|
| 13,590 | 7/1894 | Great Britain. |

LOUIS R. PRINCE, Primary Examiner

WILLIAM A. HENRY II, Assistant Examiner